United States Patent [19]

Schilling et al.

[11] Patent Number: 5,165,856
[45] Date of Patent: Nov. 24, 1992

[54] FAN BLADE MOUNT

[75] Inventors: Jan C. Schilling, Middletown; Charles E. Steckle, Loveland, both of Ohio

[73] Assignee: General Electric Company, Cincinnati, Ohio

[21] Appl. No.: 658,273

[22] Filed: Feb. 20, 1991

Related U.S. Application Data

[62] Division of Ser. No. 201,232, Jun. 2, 1988.

[51] Int. Cl.$^5$ .............................................. F04D 29/34
[52] U.S. Cl. ............................ 416/204 R; 416/204 A; 416/217; 416/219 R; 416/500
[58] Field of Search .............. 416/204 R, 204 A, 217, 416/219 R, 131, 134 RA, 141, 500

[56] References Cited

U.S. PATENT DOCUMENTS

| | | | |
|---|---|---|---|
| 1,927,592 | 9/1933 | Lambert | 416/147 |
| 2,219,288 | 10/1940 | Avery | 416/141 |
| 2,250,826 | 7/1941 | Everts | 416/141 |
| 2,536,041 | 1/1951 | Dorand | 416/141 |
| 2,537,739 | 1/1951 | Chilton | 416/134 |
| 2,990,018 | 6/1961 | Moore | 416/131 |
| 3,047,726 | 7/1962 | Warnken | 290/55 |
| 3,167,131 | 1/1965 | Voisard | 416/154 |
| 3,261,405 | 2/1965 | Andrews | 416/46 |
| 3,389,640 | 6/1968 | Best et al. | 60/245 |
| 3,551,069 | 12/1970 | Morris | 416/46 |
| 3,554,668 | 1/1971 | Wagle | 416/217 |
| 3,687,569 | 8/1972 | Klompas | 416/500 |
| 3,694,104 | 9/1972 | Erwin | 416/230 |
| 3,860,361 | 1/1975 | McMurtry et al. | 416/120 |
| 4,045,149 | 8/1977 | Ravenhall | 416/135 |
| 4,047,840 | 9/1977 | Ravenhall et al. | 416/135 |
| 4,110,056 | 8/1978 | Stevenson | 416/239 |
| 4,178,667 | 12/1979 | Stevens et al. | 416/241 R |
| 4,772,179 | 9/1988 | Bennett et al. | 416/129 |
| 4,913,623 | 4/1990 | Schilling et al. | 416/129 |

FOREIGN PATENT DOCUMENTS

| | | |
|---|---|---|
| 0277906 | 10/1988 | European Pat. Off. . |
| 284778 | 10/1988 | European Pat. Off. . |
| 1059752 | 3/1954 | France . |
| 270936 | 9/1950 | Switzerland . |
| 641131 | 1/1979 | U.S.S.R. . |
| 1114820 | 9/1984 | U.S.S.R. . |
| 267179 | 2/1927 | United Kingdom . |
| 485841 | 5/1938 | United Kingdom . |
| 541078 | 11/1941 | United Kingdom . |
| 621315 | 4/1949 | United Kingdom . |
| 948881 | 2/1964 | United Kingdom . |
| 1020896 | 2/1966 | United Kingdom . |
| 2170868 | 8/1986 | United Kingdom . |
| 2192943 | 1/1988 | United Kingdom . |

OTHER PUBLICATIONS

An Introduction to the Mechanics of Solids, McGraw-Hill Book Company, New York (1959), pp. 15 and 16 (edited by Crandall and Dahl).
Statics and Dynamics, John Wiley & Sons, Inc., New York (1969) pp. 40 and 41, by J. L. Meriam.

Primary Examiner—John T. Kwon
Attorney, Agent, or Firm—Jerome C. Squillaro; Charles L. Moore, Jr.

[57] ABSTRACT

An aircraft propeller system of the unducted fan type includes a plurality of propeller blades which are respectively fastened to a rotor, rotate about an axis of rotation and also rotate about a pitch axis. Each blade is fastened to the rotor by a hinge which has a pivot axis to reduce the effective stiffness of each blade, the pivot axis being non-parallel to the axis of rotation.

12 Claims, 8 Drawing Sheets

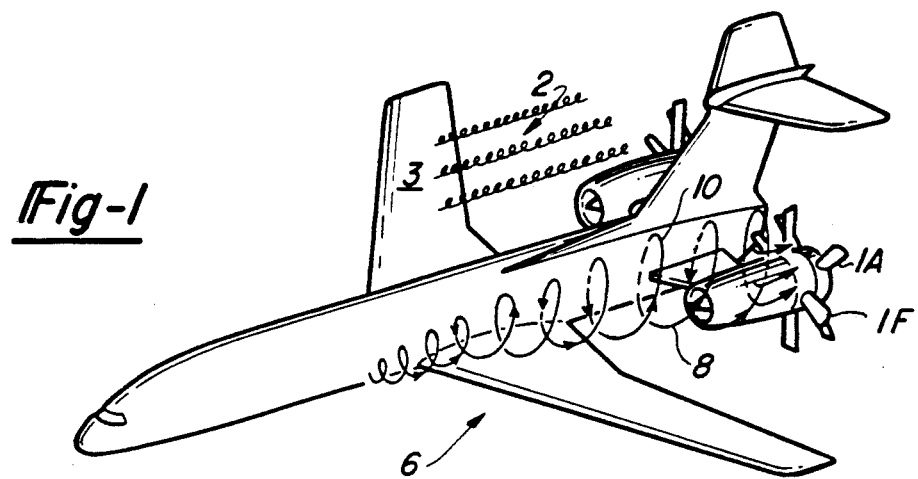
*Fig-1*
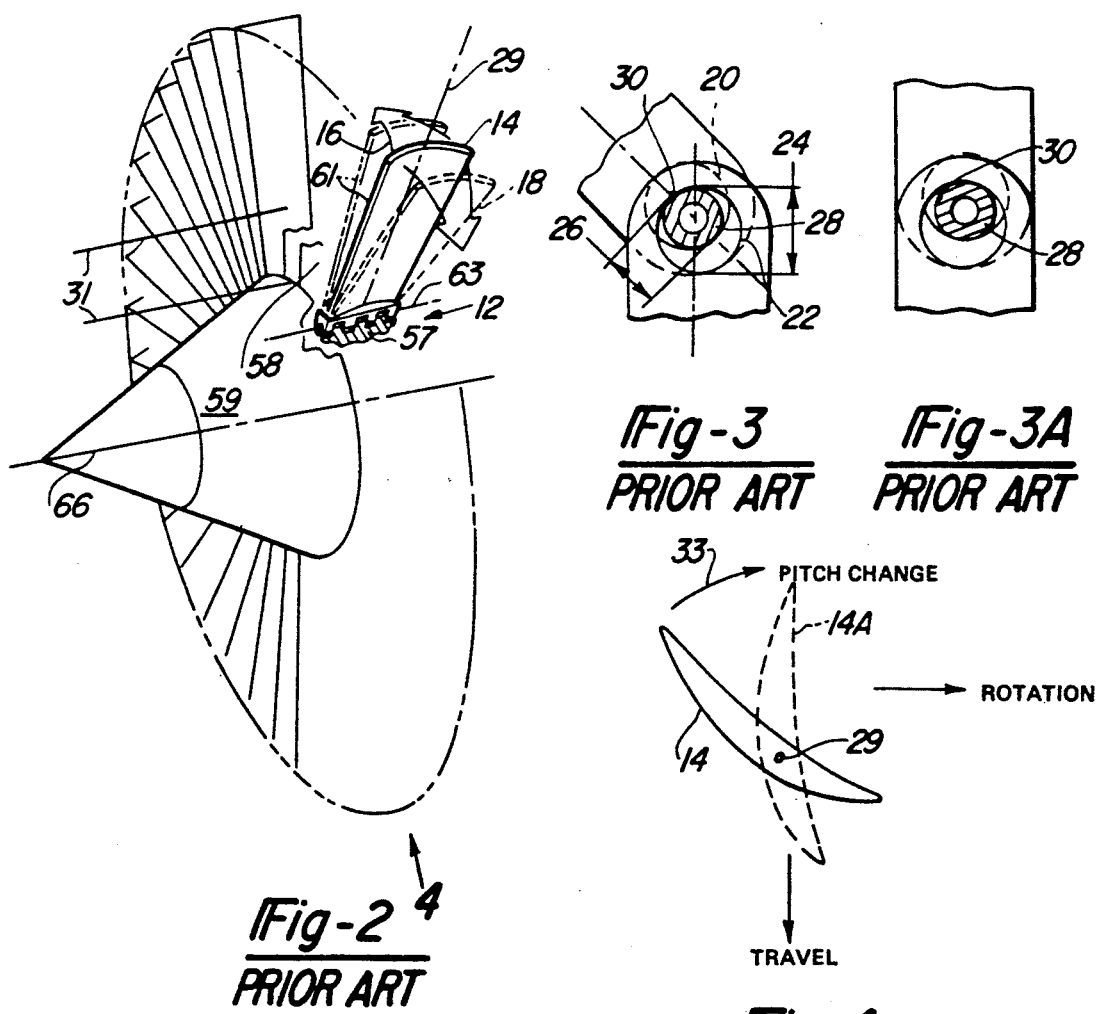
*Fig-2*
*PRIOR ART*
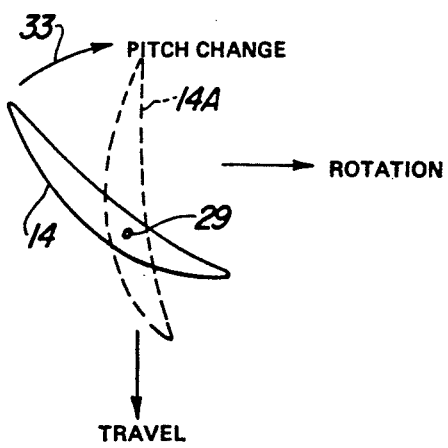
*Fig-3*
*PRIOR ART*
*Fig-3A*
*PRIOR ART*
*Fig-4*

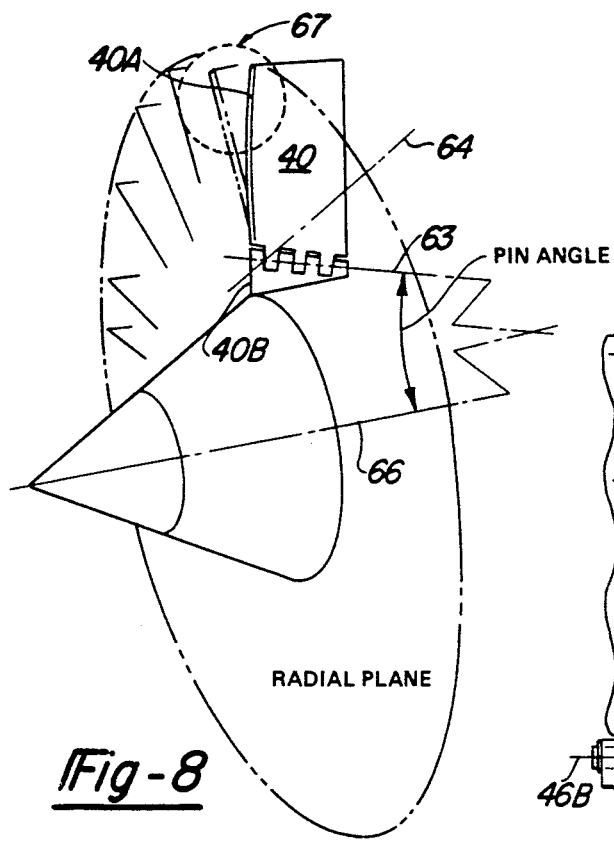
*Fig-8*
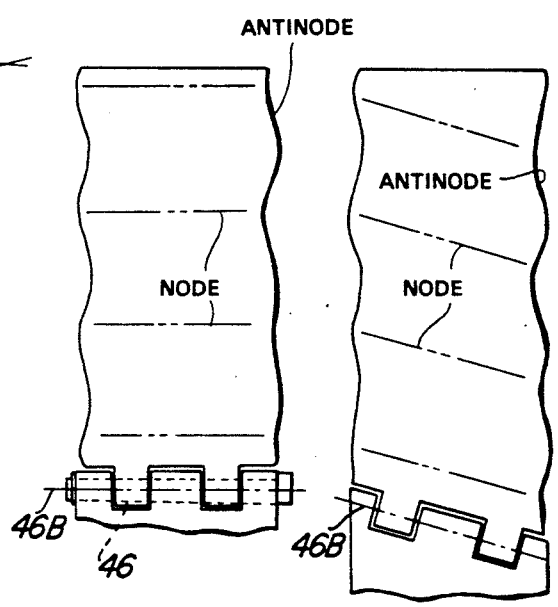
*Fig-9*
BENDING
*Fig-10*
BENDING
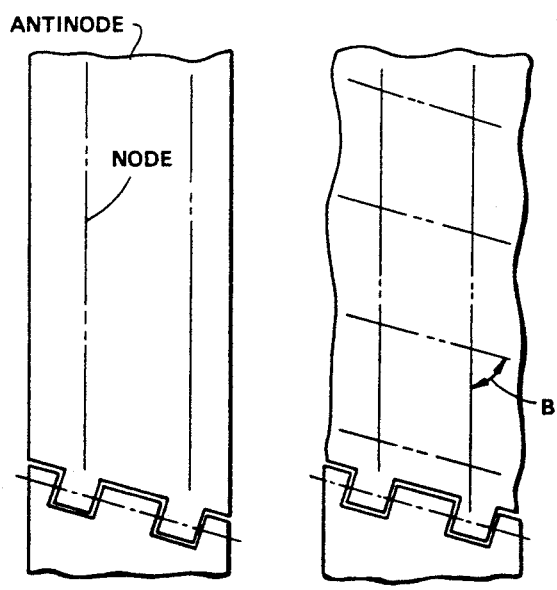
*Fig-11*
TORSION
*Fig-12*
TORSION & BENDING

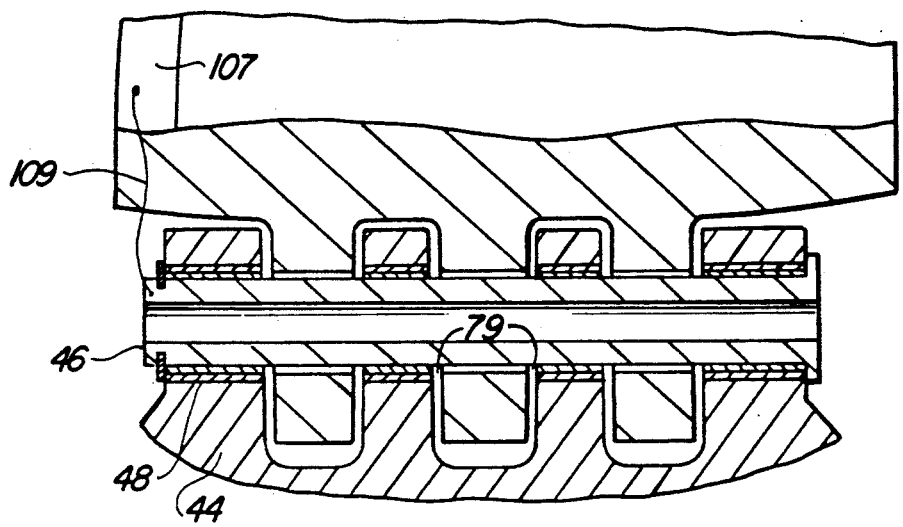
Fig-15
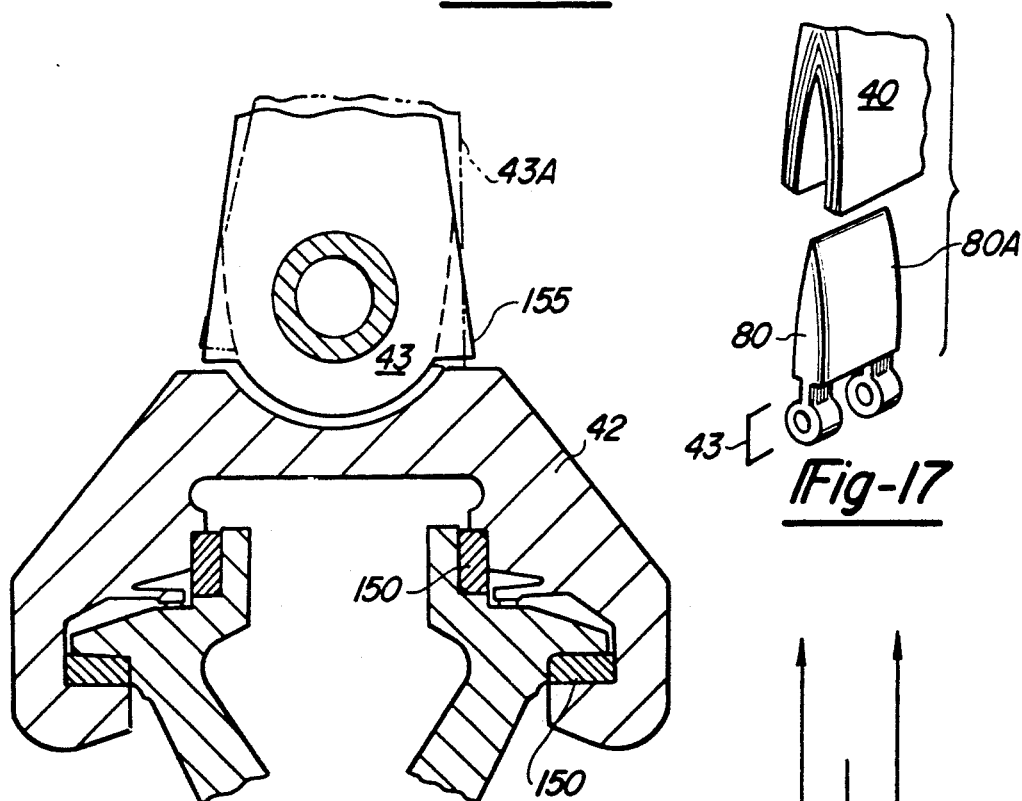
Fig-16
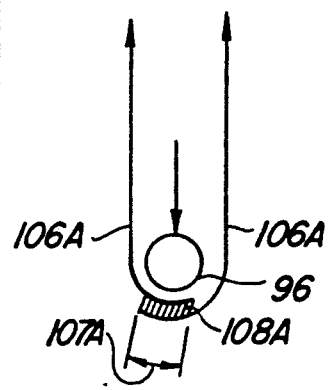
Fig-17
Fig-19A

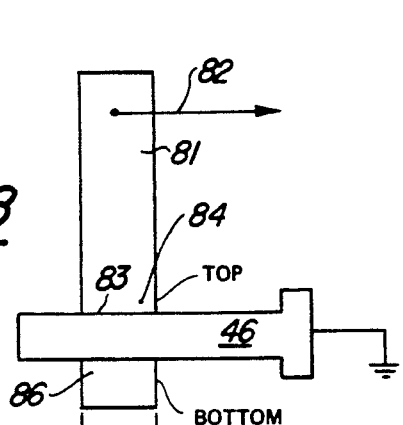
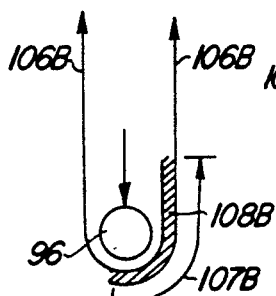
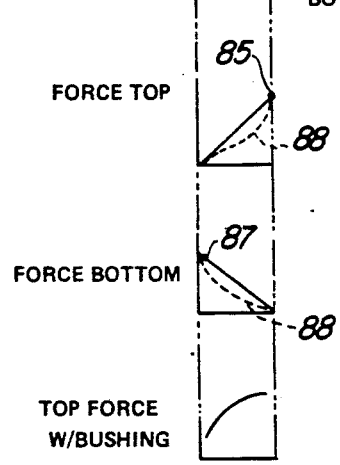
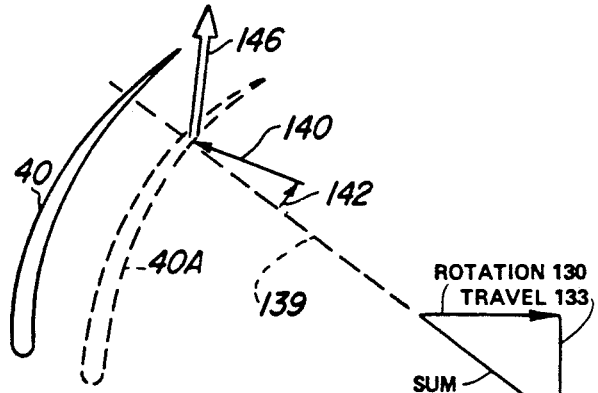
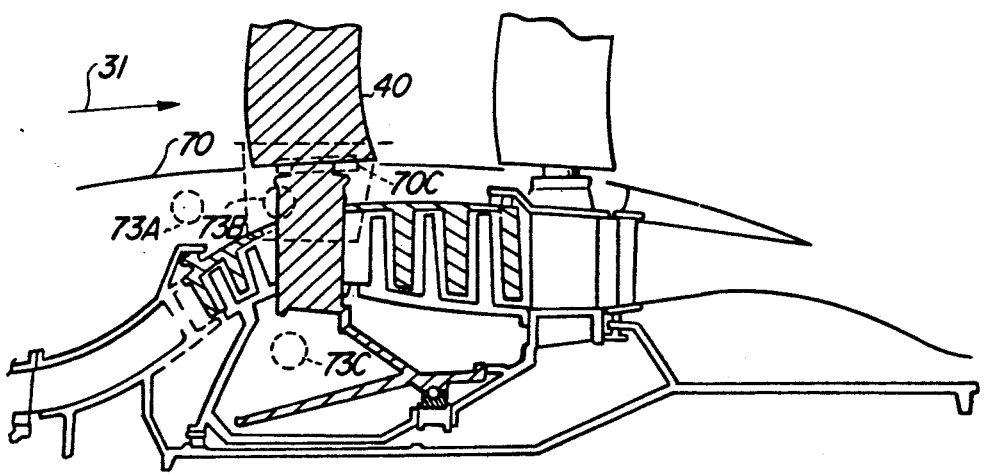

FAN BLADE MOUNT

This application is a division of application Ser. No. 07/201,232, filed Jun. 2, 1988.

The invention relates to the fastening of an aircraft propeller blade to a mounting platform.

BACKGROUND OF THE INVENTION

FIG. 1 illustrates an aircraft driven by counter-rotating, pusher propellers 1A and 1F. The propeller blades are swept as shown in FIGS. 6 and 13 to allow flight speeds up to mach 0.85. It has been found that the arrangement shown creates several unique sources of vibratory excitation which disturb the propeller blades. For example, the wake 2 shed by the wing 3 presents a discontinuity through which the propeller blades must pass, providing one source of excitation. A second source of excitation arises when the aircraft has a high angle of attack, as occurs during takeoff, climb and approach. At this time, the fuselage sheds a vortex 6 which enters the propellers 1A and 1F. The vortex 6 disturbs the propeller blades first when they pass through a first edge 8 of the vortex and also when they leave, passing through edge 10. In addition, high air disturbance is encountered during pitch, yaw and roll maneuvers.

The blades themselves have a natural resonant frequency in the range of ten to seventy hertz. Given that the propellers rotate at about twenty revolutions per second, the one-per-revolution and two-per-revolution excitations caused by the wake 2 and the vortex 6 provide a stimulus within this response range. That is, the wake provides twenty excitations per second per blade, and the vortex provides forty excitations per second.

In previous designs, the resonant frequency of aircraft fan blades (not propeller blades) has been reduced by the use of so-called pinned root mounting systems. One example is the pinned root system found on the TF 34 engine which is sold by the General Electric Company. This type of mounting is illustrated in FIG. 2. A hinge 12 is fastened to the base of each fan blade 14, thus allowing the blade to rotate between dashed positions 16 and 18. There are several significant features in this arrangement. One, as shown in FIG. 3, the holes 20 and 22 in the hinge are larger in diameter 24 than the diameter 26 of pin 28. As a result, when blade 14 rotates about the pin axis 63, the pin rolls (rather than slides) to a new position as shown in FIG. 3A. There is little or no rubbing of pin 28 in holes 20 and 22. Reference mark 30 indicates that pin 28 rolls and does not slide.

Two, the pinned root system just described has been used on a turbofan engine in which the pitch of the fan blades is fixed. That is, as shown in FIG. 4, which is a view of one blade 14 in FIG. 2 taken along line 4, there is no rotation of the fan blades from solid position 14 to phantom position 14A, indicated by arrow 33. To repeat, such rotation about pitch axis 29 in FIG. 2, or pitch change, is absent.

The absence of pitch change, coupled with high blade centrifugal forces, tolerates the use of the rolling, loose pin shown in FIG. 3. However, when a pitch-changing blade is used at low rotational speeds, the loose pin mount causes the problem which is shown in exaggerated form in FIG. 5. The aerodynamic forces and the centrifugal forces acting on the blade tend to drive the pin 28 into a skewed position as shown. Such skewing is undesirable at least for the reason that the angle of attack of the blade becomes somewhat decoupled from the position of lower hinge half 57 in FIG. 2.

A third feature is that the hinge pin 28 is located outside, and not within, the fan stream indicated by arrows 31. That is, the hinge pin is located below the blade platform 58 in FIG. 2, behind the spinner 59. In such a location, the pin is surrounded by air at a low (approximately ambient) temperature.

A fourth feature is that the pin is approximately parallel with the axis of rotation 66 of the fan. This causes the leading edge 61 of the blade 14 to remain in the same radial plane when deflection into phantom position 16 occurs.

OBJECTS OF THE INVENTION

It is an object of the present invention to provide a new and improved aircraft propeller mount.

It is a further object of the present invention to provide an improved system for combatting vibration in aircraft propellers.

SUMMARY OF THE INVENTION

In one form of the invention, an aircraft propeller blade is fastened to a mounting platform by means of a pin, resembling, in some respects, a hinge pin. The clearances between the pin and the bosses through which it is journaled are very small, thereby preventing skewing of the propeller blade when the pitch is changed.

BRIEF DESCRIPTION OF THE DRAWING

FIG. 1 illustrates an aircraft powered by counter-rotating pusher propellers.

FIG. 2 illustrates a pinned root mount in an aircraft fan.

FIGS. 3 and 3A illustrate motion of the pin mounting system of FIG. 2. FIG. 4 illustrates pitch change in an aircraft propeller.

FIG. 8 illustrates another form of the invention.

FIGS. 9 and 10 illustrate nodes which can occur in the propeller blades during bending.

FIGS. 11 and 12 illustrate nodes which can occur in propeller blades under torsion.

FIG. 15 illustrates another form of the invention, including a conductor for transmitting the charge deposited by lightening strikes.

FIG. 16 illustrates another form of the invention.

FIG. 17 illustrates a type of blade root construction which is different from that of FIG. 13.

FIG. 18 illustrates force magnitude plotted as a function of position within a blade clevis 43. The clevis is indicated as beam 81.

FIGS. 19A–C illustrates the splicing together of fibers.

FIG. 20 is a schematic cross-section of an aircraft engine with which the invention can be used.

FIG. 21 is a vector diagram which illustrates an object striking a propeller blade.

DETAILED DESCRIPTION OF THE INVENTION

Figure 6:
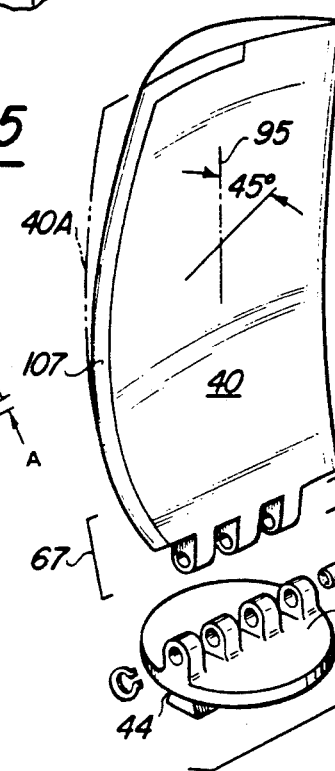
FIG. 6 illustrates one form of the invention.

FIG. 6 illustrates one form of the invention. In that Figure, a fan blade 40 is hinged to a blade platform 42 by a pin 46. The blade 40 bears a clevis 43, and the platform 42 bears a mating clevis 44. The two clevises are held together by pin 46.

Figure 5:
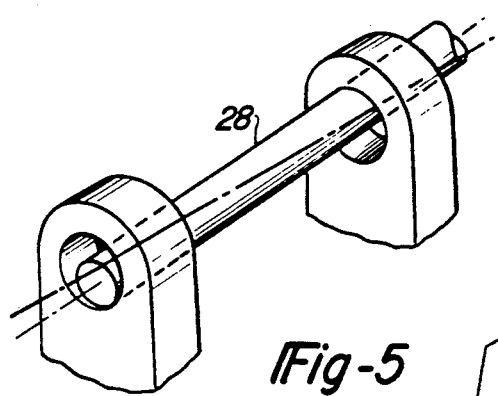
FIG. 5 illustrates a type of misalignment of the pin which can occur in the arrangement of FIG. 2.

As shown in FIG. 6, an antifriction bushing 47 surrounds the pin 46. The bushing is constructed of an antifriction material such as that sold under the name Fabroid X, available from Lear Siegler, Inc., located in Phoenix, Ariz. Preferably, the bushing deviates in thickness by −0.002 to +0.001 inches from the thickness of the space surrounding the pin, thus providing a slight friction fit. This arrangement allows the fan blade to pivot as shown by phantom outline 40A, yet not become skewed as described in connection with FIG. 5. The bushing serves to maintain alignment of clevises 43 with respect to axis 46B.

Figure 6A:
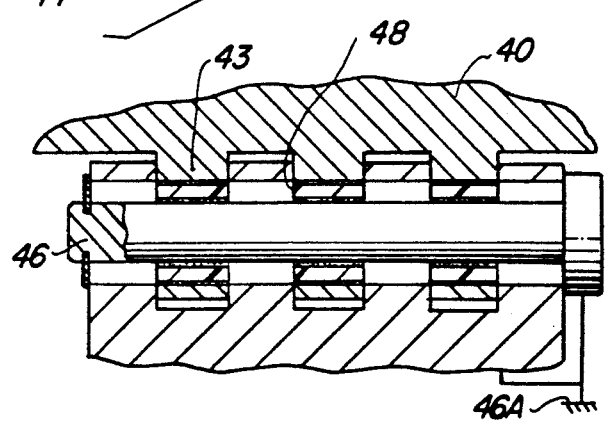
FIG. 6A illustrates a second form of the invention.

In another form of the invention, antifriction bushing 47 is replaced by several elastomeric bushings 48 in FIG. 6A which are fastened to the blade clevis 43 by adhesives or splines, while the pin 46 is anchored and non-rotating as indicated by ground symbol 46A. (Alternately, the pin 46 can be rigidly attached to the blade clevis 43, and the elastomeric bushings 48 can be fastened between the pin and the platform clevis 42, and thereby mechanically grounded.)

Figure 7:
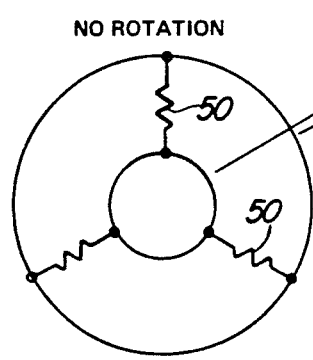
FIGS. 7 and 7A illustrate in schematic form the deformation of the elastomeric bushing in FIG. 6.
Figure 7A:
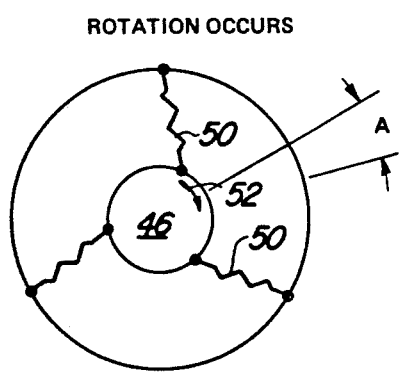

With the elastomeric bushings installed, when the blade 40 pivots, each elastomeric bushing deforms, as shown schematically by the stretching of springs 50 (which represent the elastomer) in the sequence of FIGS. 7 and 7A, in which arrow 52 indicates rotation.

The elastomeric bushings tend to smooth out the static force distribution experienced by the clevises, as will be explained with reference to FIG. 18. In that figure, one part of the blade clevis 43 is shown as beam 81 through which pin 46 is journaled. When a moment is applied to the beam 81, as by a force indicated by arrow 82, the force acting on the walls of hole 83 is roughly as plotted in the graphs labeled "Force Top" and "Force Bottom". That is, the force at point 84 on beam 81 is high, as indicated by point 85 on plot "Force Top", and, similarly, for point 86, as shown by point 87 on plot "Force Bottom". (It is recognized that the plots of FIG. 18 are approximate, and that they may take the form of dashed plots 88, depending on the compressibility of the beam 81.)

The elastomeric bushing redistributes the force, as indicated in the plot labeled "Top Force with Bushing", thus reducing the loading of the material at points 84 and 86 on the beam 81.

Another form of the invention is shown in FIG. 8, wherein the axis 63 of the pin (not shown and which is also the axis about which the fan blade deflects), is not parallel with the axis of rotation 66 of the fan.

Stated another way, the pin is oriented so that upon blade deflection, the leading edge 40A of fan blade 40 penetrates the radial plane of the root 40B, as shown in region 67.

One benefit of this type of pin arrangement is explained with reference to FIGS. 9–12. The modes of oscillation excited in the blade because of bending forces tend to provide nodes and antinodes resembling those shown in greatly exaggerated form in FIG. 9. The nodes and antinodes tend to be parallel with the axis 46B of pin 46. Other loads, induced by torsional aerodynamic loading, tend to generate a nodal pattern shown in FIG. 11. The form of invention under discussion allows the angle B, in FIG. 12, which is the angle between bending nodes and torsional nodes, to be controlled. The ability to control angle B is desirable, as it allows one to obtain an amount of control over the oscillatory behavior of the fan blade and to thereby enhance blade stability. That is, one can control the flex-torsional frequency coupling in the blade. Angle B depends to a large degree upon the pin angle shown in FIG. 8.

Figure 13:
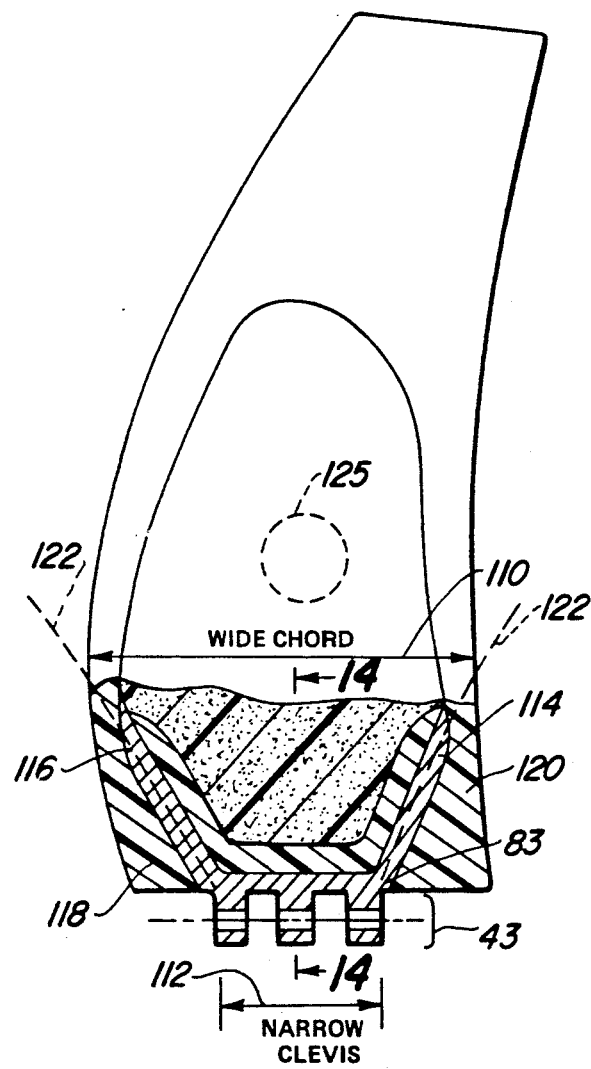
FIG. 13 illustrates a type of attachment between the pin clevis and the propeller blade.
Figure 14:
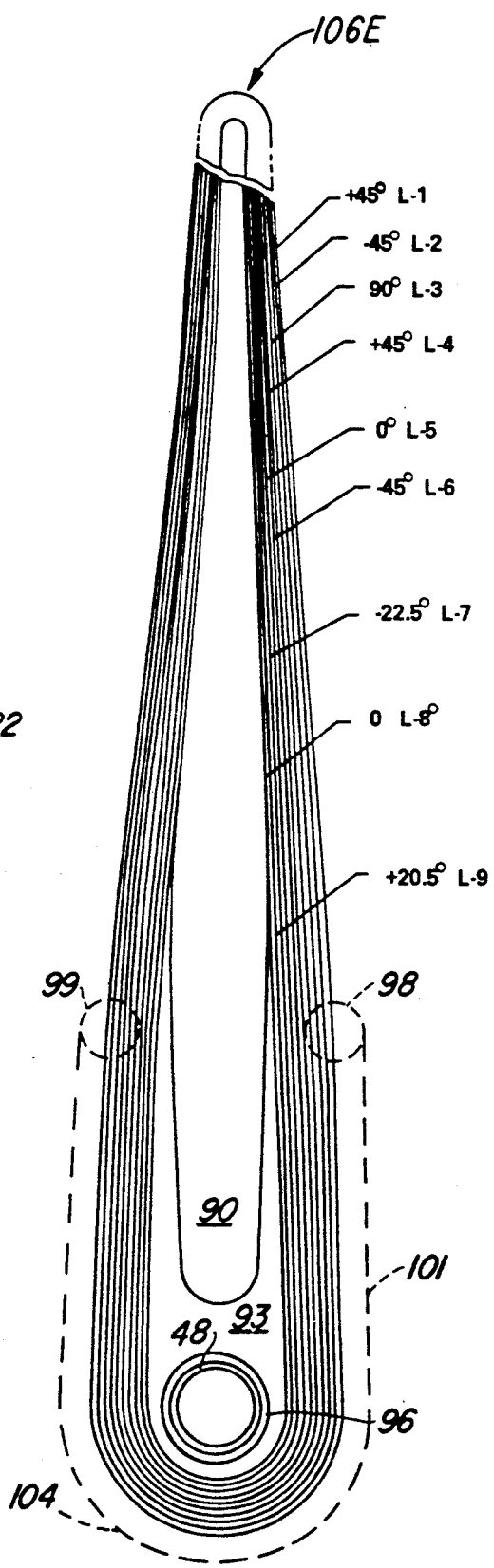
FIG. 14 illustrates a second view of blade 13 taken along lines 14—14.

One method of constructing the blade root 67 in FIG. 6 is illustrated in FIG. 14, which is a view taken along lines 14—14 in FIG. 13. In FIG. 14, a foam core 90 is partially surrounded by an eyelet 93 which encloses a steel bushing 96 for strength. The steel bushing surrounds the anti-friction bushing 48 in FIG. 4. Several layers (e.g., L1) of graphite or glass fiber are wrapped, or looped, around the eyelet as shown. The fibers are bound within a resin matrix, such as epoxy. It is important that the fibers run continuously from region 98 along dashed path 104 to region 99. This gives greater support against centrifugal loads than if the fibers were, for example, spliced at point 104.

This greater support is further illustrated in FIGS. 19A–C. In FIG. 19A, fibers 106A overlap in region 107A, and the resin 108A between them is placed in shear. In FIG. 19B, the fibers 106B overlap over a greater region 107B, and a greater length of resin 108B is placed in shear. In FIG. 19C, an even greater region 107C of overlap occurs, with a greater resin section 108C placed in shear. The situation of FIG. 19C is preferred because, in general, the resin 108C is not as strong in shear as the fibers 106C are in tension. Therefore, a greater region of overlap (i.e., a longer splice) is preferred when splices occur.

However, it is preferred that, whenever possible, splices be eliminated, and that fibers run continuously from the tip 106E in FIG. 14, around the region containing bushing 96 at the root of the blade, and out to the tip 106E again. That is, regions 98 and 99, which contain the ends for the path 101 along which fibers now in question run, are located at the tip 106E.

The orientation of fiber direction in each of nine layers is given by the angles indicated. The angles are measured with respect to an imaginary axis 95 shown in FIG. 6 which coincides with the direction of centrifugal force experienced by the blade. For example, as shown in that figure, the fibers running as shown make approximately a 45° angle. The graphite fibers are impregnated with a suitable resin, known in the art, and then cured in an autoclave, or a resin transfer molding (RTM) process can be used.

In another form of the invention, a protective metallic nosing 107 is attached to the leading edge shown in FIG. 6. The nosing serves the function of protecting against foreign object damage, as would occur when the blade strikes a bird, and also provides a conductive path for lightning from the otherwise non-conductive, composite blade. In addition, as shown in FIG. 15, a metallic rod 109 connects the protective nosing 107 with the pin 46, preferably near the end of the pin so that the bushing 48 need not be penetrated. The rod 109 provides a dissipative path for lightning which strikes blade 40.

The platform clevis 44 is metallic and is connected by a metallic, conductive path to the aircraft engine, which is, in turn, connected to the body of the aircraft shown in FIG. 1. This conductive path distributes the charge acquired by the propeller blade and allows the charge to be dissipated over the body of the aircraft. Freestream air scrubs away the charge.

FIG. 16 illustrates another form of the invention. The platform 42 which carries the platform clevis (not shown) is supported by solid-state bearings 150, of a type known in the art, which allow the pitch change described in connection with FIG. 4. The platform clevis 43 has extensions 155 which prevent rotation beyond the position indicated by phantom clevis 43A. Corner 157 strikes the platform 42, preventing further rotation. Further, the extensions are constructed so that if the blade strikes a large object, the extension will fracture, thus allowing the blade 40 to rotate through a greater angle rather than breaking. In a sense, the extensions 155 act as sacrificial limiters, which limit blade rotation, provided that the force inducing the rotation is below a certain magnitude. When the force exceeds this magnitude, the extensions are sacrificed for the benefit of avoiding damage to the blade.

Several important aspects of the invention are the following:

1. The invention is suited for use in a counter-rotating unducted fan engine of the type shown in FIG. 1. FIG. 20 is a highly schematic cross section of this engine. The temperatures within cowl 70, in regions 73A-73C, tend to be hot, at least 350° F. Such temperatures are deleterious to non-metallic, composite blades, as fan blades 40 are. The present invention serves to isolate the composite components from the high temperatures because the metallic conductive path out of region 73C terminates with platform clevis 44 in FIG. 6: blade clevis 43, as well as blade 40, are composites, not a metal. Further, the platform clevis 44 is cooled by the fan flow path, indicated by arrow 31, in FIG. 20, which is at or near ambient temperature. In flight conditions, this ambient temperature can be about −50° F.

2. The metallic platform clevis 44 provides a path for dissipating lightning strikes.

3. The point of attachment of the fan blade to the platform is within the fan flow path, in block 70C in FIG. 20. The point of attachment is not within cowling 70, nor near hot region 73B. As mentioned, this assists in blocking heat flow from the hot inner regions of cowling 70.

4. The fact that the blade can bend by virtue of the pinned root improves the resistance of the blade to impact damage by foreign objects. That is, the blade is not rigidly cantilevered from cowling 70, but can bend through angle A described in FIG. 7. This bending provides the following advantage.

When a propeller blade strikes a foreign object such as a bird, the situation resembles that shown in FIG. 21. Rotation of the propeller blade is indicated by vector 130, while forward motion of the aircraft is indicated by vector 133. The motion of the propeller with respect to the earth is the sum of these two vectors, indicated by vector sum 136. When the foreign object strikes the blade, the object will probably be traveling along dashed line 139, which is coincident with vector sum 136.

The motion of the object can be resolved into two vectors, namely, one vector 140 normal to the surface of the blade, and another vector 142 parallel with the blade surface. Upon impact, the normal vector 140 deflects the blade from phantom position 40A to solid position 40. This deflection clears a path for the object, so that, in many cases, the object would be free to travel downstream and clear the blade, roughly along the path indicated by large arrow 146. In a sense, the pinned mount allows the blade to swing free of the object.

5. In moving the point of attachment of the fan blades into the fan flow path, increased space is attained within the cowling 70, near region 73B in FIG. 20, when compared with a system shown in FIG. 2.

6. The fact that the fan blade is attached external to cowling 70 facilitates quick removal and replacement.

7. As a general rule, there must be a metallic component in the load path between the centrifugal and aerodynamic loads imposed by the composite fan blade 40 and the engine component which absorbs these loads. Some prior art approaches bond the composite blade 40 in FIG. 17 to a metallic spar 80 which can be attached to the metallic component by means of the blade clevis 43. In this case, the metallic component would be the platform clevis 44 in FIG. 6. This approach requires an adhesive bond between composite and metal, for example on surface 80A.

In distinction, the present invention eliminates such an adhesive bond, and instead links a composite blade clevis 43 in FIG. 6 with a metallic platform clevis 44 using metallic pin 46. Restated, there is no adhesive junction between composites and metals which is placed in shear. Instead, the centrifugal load is borne by graphite fibers, which are generally in tension, and transmitted to the platform clevis 44 through metallic pin 46. The shear load exists at the interfaces 79 in FIG. 15 between clevis components, and is taken by the pin 46.

8. A typical aircraft fan blade is mounted loosely in a slot. The blade becomes tightly held in the slot during operation by centrifugal force. However, during times of non-operation, the wind can blow through the fan, causing the fan to windmill, and causing the blades to move in their slots and to "clank." Clanking damages the blade mounts. The friction fit of the bushing 47 and the adhesion of the elastomeric bushing 48 described above will tend to reduce or eliminate clanking.

9. The term "pinned" connection is well defined in the art. See, for example, J. L. Meriam, *Statics and Dynamics*, John Wiley & Sons, Inc., New York (1969), pp. 40 and 41; and Crandall and Dahl, *An Introduction to the Mechanics of Solids*, McGraw-Hill Book Company, New York (1959), pp. 15 and 16.

10. The pinned root reduces stress on the blades in the root region by reducing or eliminating moments resulting from steady aerodynamic loading. The lowered stress results in a greater load capability and longer lifetime of the blade.

Figure 22:
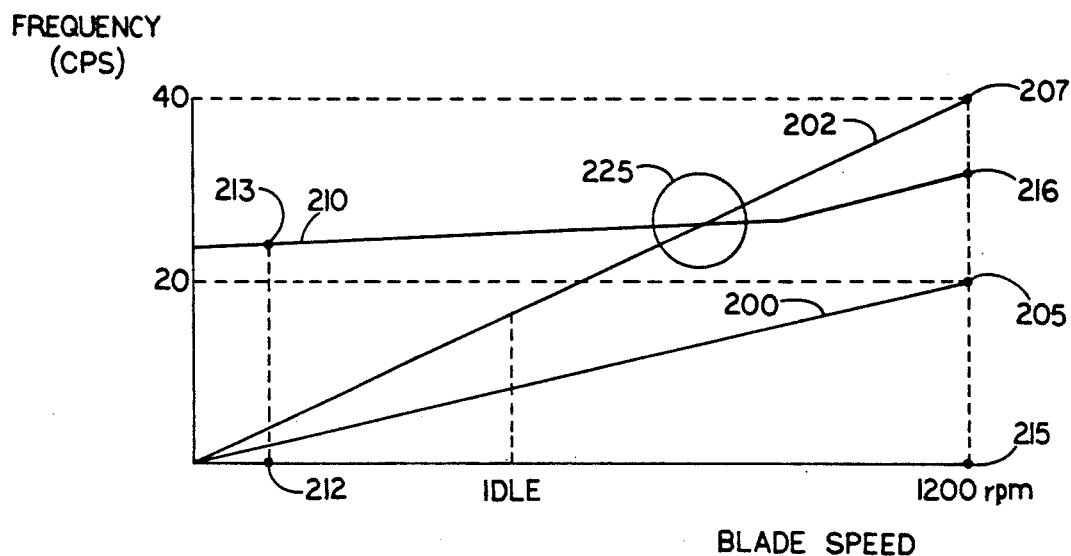
FIGS. 22 and 23 illustrate plots of vibrational frequency versus propeller blade speed.
Figure 23:
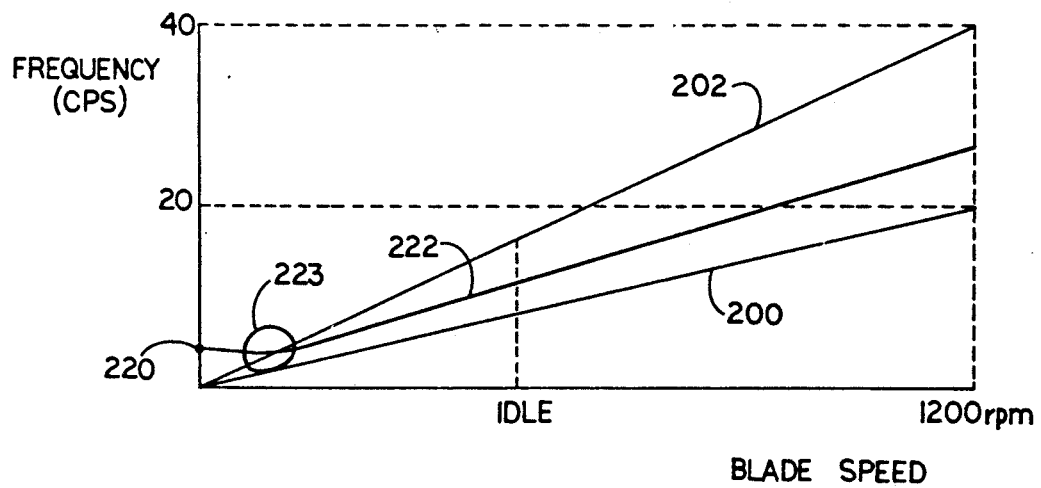

Another result of this moment reduction can be explained with reference to FIGS. 22 and 23. FIG. 22 gives a vibration plot for an exemplary prior art propeller (not shown) having a standard blade retention system (i.e., a pinned root is absent). Line 200 gives a linear, one-to-one conversion from rpm (on the horizontal axis) to cycles per second (cps, on the vertical axis) for one-per-revolution excitations induced by the blade. For example, point 205 indicates that 1200 rpm converts to 20 cycles per second, meaning that, at 1200 rpm, the number of one-per-revolution excitations occurring per second is twenty. Similarly, line 202 converts rpm to two-per-revolution excitations. For example, point 207 indicates that 1200 rpm corresponds to 40 cycles per second. An example of a source of two-per-revolution excitations was given above in connection with vortex edges 8 and 10 in FIG. 1.

The exemplary propeller blade, in lacking a pinned root, can be viewed as a cantilevered beam, which is a relatively stiff structure. The stiffness causes a relatively high resonance curve 210 to exist for the blade. (The resonance curve can vary slightly from blade-to-blade in a given propeller: each blade can have a slightly different resonant frequency at a given speed.) One reason for the increase, in FIG. 23, of resonance frequency which occurs as speed increases is that centrifugal force stiffens the blade.

The resonance curve 210, in general, gives the respective frequencies, in cycles per second, at which the blade is resonant, for different propeller speeds. For example, at a low speed 212, resonance is about 25 cycles per second, as indicated by point 213. At a high speed 215, resonance is about 30 cycles per second, as indicated by point 216. The type of data given by the resonance curve 210 should not be confused with that given by lines 200 and 202. These latter lines convert from the units of rpm (on the horizontal axis) to cps (on the vertical axis), and do not give data concerning an element external to the plot, such as a propeller blade.

Figure 24:
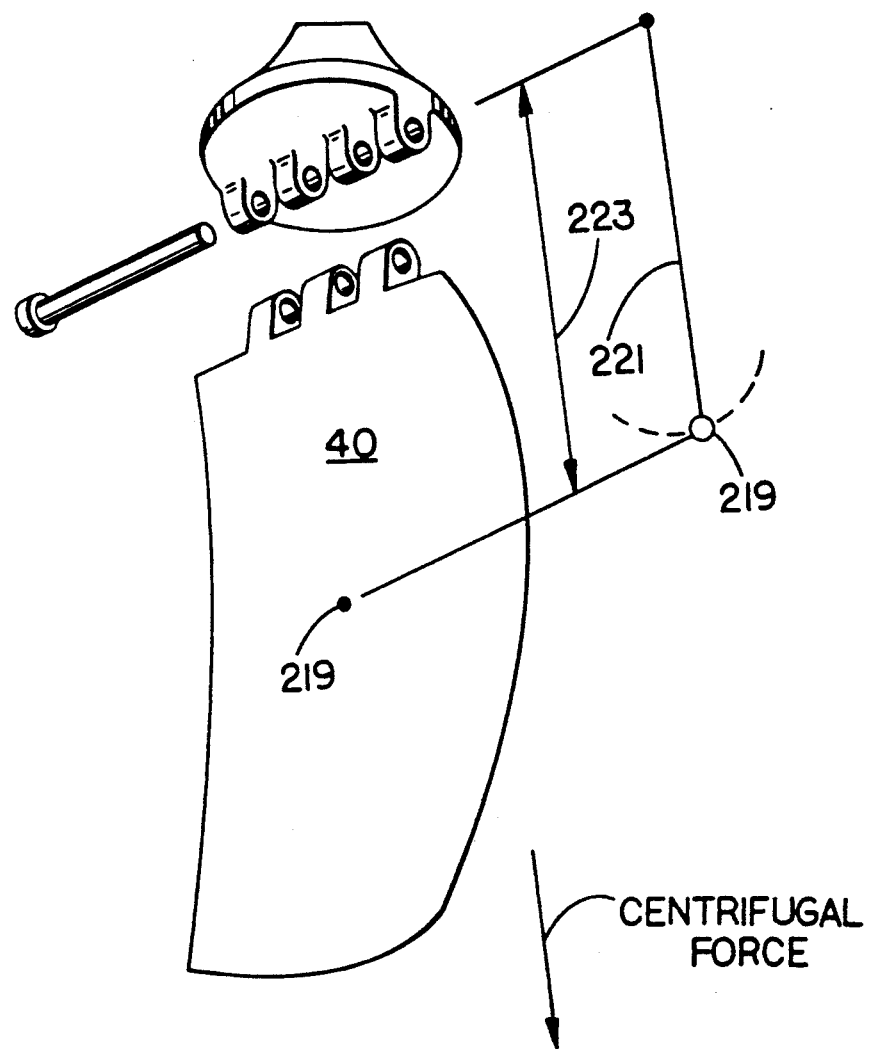
FIG. 24 illustrates a point mass 219 of a propeller blade and a pendulum whose behavior can resemble that of the point mass.

In contrast to the exemplary blade, the pinned root blade of FIG. 6 has reduced stiffness: the blade is no longer cantilevered, but more resembles a pendulum as shown in FIG. 24. In that Figure, blade 40 is shown inverted, because the action of centrifugal force resembles that of gravity upon a pendulum. In an approximate sense, the blade 40 can be viewed as a point mass 219 swinging on a massless string 221 which is about 24 inches (dimension 223) long. The blade resembles a pendulum.

In point of fact, a pendulum which is about one meter long has a period of about two seconds, which corresponds to a frequency of 0.5 cps. The pendulum of FIG. 24, in being 24 inches long, will have a shorter period, which, for purposes of illustration, will be assumed to be 1.5 seconds, which corresponds to a frequency of 0.6 cycles per second. Therefore, at very low speeds when centrifugal force is minimal, the resonant frequency of the blade/pendulum is indicated by point 220 in FIG. 23, which is near 0.6 cps.

As blade speed increases, the blade stiffens under centrifugal loading, and the resonant curve follows line 222. It is significant that the resonant curve 222 of the pinned root blade crosses the two-per-revolution exciting curve 202 within circle 223, at a low propeller speed which is below idle speed and outside the normal operating range of flight speeds. Further, the curve 222 does not cross the one-per-revolution line 200 at all.

In contrast, the resonance curve 210 in FIG. 22 of the exemplary prior art propeller crosses the excitation curve 202 within circle 225, which is undesirable because this crossing is within the normal operating range (i.e., between idle and take-off speeds) of the propeller. The propeller blade cannot be operated for a sustained length of time when the excitation frequency equals a resonant frequency of the blade, because damage to the blade will occur. The analogous crossing for the present invention is within circle 223 in FIG. 23, which is outside the normal operating range of the propeller, thus eliminating the possibility of damage or fatigue due to resonance phenomena.

An invention has been described wherein a propeller, or fan, blade is mounted to a rotor using a pinned hinge arrangement. The blade is of the variable pitch type. The arrangement reduces the resonant frequency of the blade by utilizing a pinned attachment to the rotor. This reduction in resonant frequency, it is believed, reduces excitation of the blade in the first flexure (i.e., first bending) mode. (While excitations may exist in other modes, i.e., at other frequencies, such excitations are of less concern because, in general, the blades naturally damp out vibrations at the other modes better than vibrations at the first mode.) The angle which the pin makes with the axis of rotation can be controlled in order to adjust the angle which the bending nodes make with the torsional nodes.

Further, the propeller blade is constructed of composite materials, which are not so heat and damage resistant as are metals. A protective metallic nosing protects the blade during strikes with foreign objects. The nosing also serves the function of providing a conductive path for lightning.

In the invention, the hinge is located in the flowpath. One clevis of the hinge is metallic, and thus conductive. This clevis is connected to the hot sections of the engine, thus providing a heat flow path from the hot sections toward the blade. However, this clevis is cooled by the flowpath air, thus short-circuiting the heat flow path to the atmosphere. The other clevis is composed of composite materials.

Numerous substitutions and modifications can be undertaken without departing from the true spirit and scope of the present invention as defined in the following claims.

We claim:

1. In an aircraft which produces stimuli which excite propeller blades of the unducted type in a first flexure mode, the improvement comprising:
   a) means for allowing pitch change of the blades during operation; and
   b) means for rotating said blades about a first axis coupling means center about a second axis nonparallel to said first axis for preventing resonance by the blades in the first flexure mode.

2. An aircraft propeller of the tail-mounted, unducted type comprising:
   a) propeller blades which:
      i) are fastened to a rotor,
      ii) rotate about an axis of rotation and
      iii) rotate about a pitch axis; and
   b) a hinge having a pivot axis fastening each blade to the rotor which reduces the effective stiffness of each blade, the pivot axis being anti-parallel to the axis of rotation.

3. An aircraft propeller of the unducted fan type comprising:
   (a) propeller blades of the variable pitch type rotating about a first axis; and
   (b) means anti-parallel with said first axis for substantially eliminating vibration of the blades in a first bending mode during propeller operation between idle and takeoff speeds.

4. The aircraft propeller system of claim 3, wherein said means for substantially eliminating vibration comprises a hinge for fastening each blade to a rotor, said hinge having a hinge pin which is non-parallel with said first axis.

5. The aircraft propeller system of claim 3, wherein each of said propeller blades are non-conductive and further comprise:
   (a) a blade platform which is rotatable about a pitch change axis;
   (b) a conductive clevis attached to said blade platform;
   (c) a non-conductive clevis which mates with said conductive clevis to form a hinged joint and to which the propeller blade is fastened; and
   (d) a conductor extending from said conductive clevis along a substantial part of the propeller blade.

6. The aircraft propeller system of claim 5 in which said conductor of paragraph (d) comprises:
   (i) a metallic protective nosing extending along the leading edge of said propeller blade; and
   (ii) a flexible conductor extending from said nosing to said conductive clevis which maintains a conductive path between said nosing and said conductive clevis during flexing of the hinged joint of paragraph (c).

7. The aircraft propeller system of claim 5, further comprising:
   means for conducting electric charge from said conductive clevis to an aircraft to which said propeller blade is attached.

8. The aircraft propeller system of claim 3, wherein said propeller blades are non-conductive, each of said propeller blades further comprising:
   (a) protective means extending along the leading edge of said propeller blade which:
      (i) comprises a material which is less subject to damage from impact with foreign objects than is the material comprising the remainder of the propeller blade; and
      (ii) conducts electric charge received during a lightening strike to a region near a root of said propeller blade; and
   (b) a charge dissipation means which spreads the electric charge from said root of the propeller blade to places on an aircraft from which the charge can be scrubbed away by freestream air.

9. The aircraft propeller system of claim 3, wherein each of said propeller blades is constructed of composite materials and comprises a plurality of fibers in a matrix forming a clevis attached to said blade.

10. An aircraft propeller of the unducted type, comprising:
    (a) propeller blades of the varaible pitch type, each having a first flexure mode of vibration; and
    (b) means for preventing the blades from resonating in the first flexure mode when the propeller operates between idle and takeoff speeds.

11. An aircraft propeller system of the unducted fan type comprising:
    a) propeller blades of the variable-pitch type which are subject to vibrational excitations of the two-per-revolution type during some phases of aircraft operation about a first axis; and
    b) means for preventing the excitations from damaging the blades anti-parallel to said first axis when the propeller is operating between idle and takeoff speeds.

12. In an aircraft employing an unducted fan type engine which produces stimuli which excite propeller blades in a first flexure mode, the improvement comprising:
    a) means for allowing pitch change of the blades during rotation about a first axis; and
    b) means anti-parallel with said first axis for preventing resonance by the blades in the first flexure mode.

* * * * *